United States Patent [19]
Katayama

[11] 4,315,558
[45] Feb. 16, 1982

[54] BELLOWS TYPE EXHAUST TUBE
[75] Inventor: Kakuji Katayama, Ibara, Japan
[73] Assignee: Katayama Kogyo Co., Ltd., Ibara, Japan
[21] Appl. No.: 105,039
[22] Filed: Dec. 19, 1979
[30] Foreign Application Priority Data
Nov. 1, 1979 [JP] Japan ................. 54-131749
[51] Int. Cl.³ .................... F01N 1/08; F01N 7/08
[52] U.S. Cl. .................... 181/227; 181/228; 181/255; 181/279; 181/282
[58] Field of Search ........... 181/211, 212, 227, 243, 181/246, 283, 282, 247-256, 264, 269; 165/52, 154, 157; 138/143, 173

[56] References Cited
U.S. PATENT DOCUMENTS

| | | | |
|---|---|---|---|
| 1,055,674 | 3/1913 | Smith | 138/173 |
| 1,266,255 | 5/1918 | Harris | 181/211 |
| 1,700,841 | 2/1929 | Graul | 181/269 |
| 2,514,170 | 7/1950 | Walton et al. | 181/256 |
| 4,050,539 | 9/1977 | Kashiwara et al. | 181/280 |

Primary Examiner—L. T. Hix
Assistant Examiner—Benjamin R. Fuller
Attorney, Agent, or Firm—Holman & Stern

[57] ABSTRACT

An exhaust system for an internal combustion engine which comprises an exhaust manifold connected to said engine, a communication pipe connected at one end to the exhaust manifold, a bellows type exhaust tube connected at one end to the other end of the communication pipe, a second communication pipe connected at one end to the other end of the exhaust tube, a muffler connected at one end to the other end of the second communication pipe and a tail pipe connected at one end to the other end of the muffler. The exhaust tube comprises a multi-layered bellows, a cylindrical wire blade, or wire mesh shield, in outwardly radial spaced relationship to the bellows, the opposed ends of the cylindrical wire mesh shield having a reduced diameter, and retainer rings securing the opposed ends of the wire mesh shield to the communication pipes.

8 Claims, 4 Drawing Figures

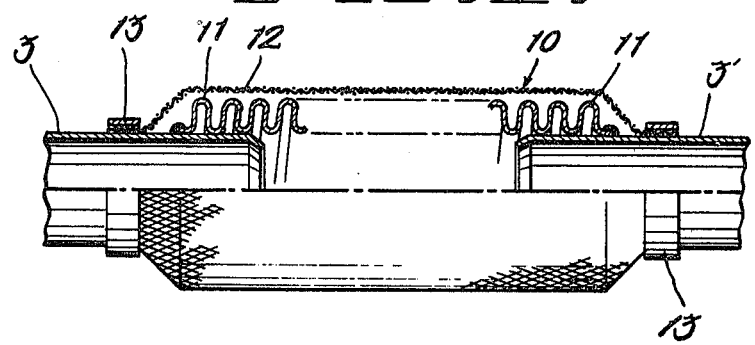
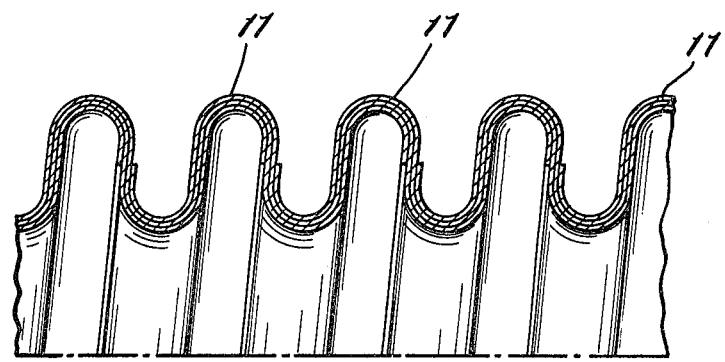

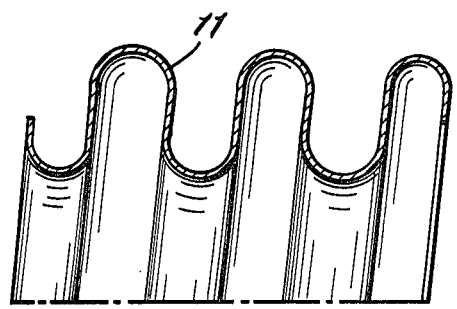
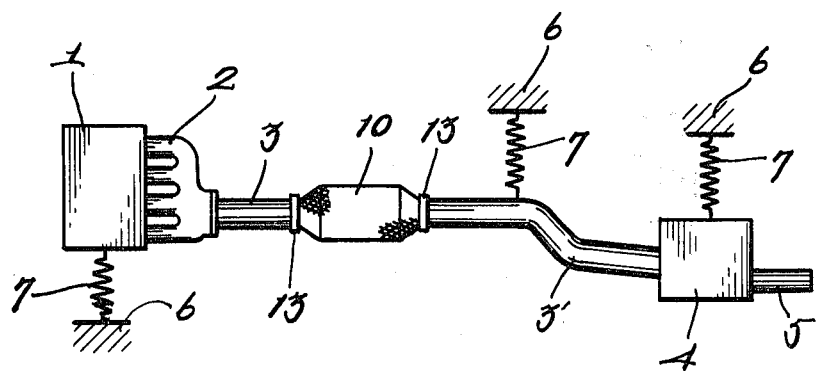

4,315,558

BELLOWS TYPE EXHAUST TUBE

BACKGROUND OF THE INVENTION

This invention relates to an exhaust system for an internal combustion engine and more particularly, to a spiral multi-layered bellows type exhaust tube for use in the exhaust system.

As the exhaust tube in the exhaust system for an internal combustion engine, a steel pipe has been commonly employed. However, since the steel pipe is rigid, the vibration of the engine is directly transmitted through the rigid exhaust pipe to the body of the vehicle to give an uncomfortable ride to the occupant or occupants. Since the engine exhaust gas, at high temperature and pressure flows, through the steel exhaust pipe, there is the further disadvantage that the noise of the exhaust gas which passes through the pipe wall (transmission noise) is high.

SUMMARY OF THE INVENTION

Therefore, the present invention serves to eliminate the disadvantages inherent in the conventional steel exhaust pipe used in vehicular engine exhaust systems referred to hereinabove.

In order to attain the above purpose, according to the present invention, there is provided an exhaust tube for use in the exhaust system of a vehicular internal combustion engine. The exhaust tube comprises a spiral, multi-layered stainless steel web bellows, a cylindrical wire blade, or wire mesh shield in outwardly radial spaced relationship to the bellows, the opposed ends of which have a reduced diameter to be secured to communication pipes in the exhaust system and retainer rings fitted on the opposed ends of the wire mesh shield to secure the wire mesh shield to the communication pipes.

The above and other objects and attendant advantages of the present invention will be more readily apparent to those skilled in the art from a reading of the following detailed description in conjunction with the accompanying drawings which show one preferred embodiment of the invention for illustration purpose only, but not for limiting the scope of the same in any way.

BRIEF DESCRIPTION OF THE DRAWINGS

FIG. 1 is a side elevational view of the preferred embodiment of the multi-layered bellows type exhaust tube of the present invention showing the upper half of the exhaust tube and the communication pipes in longitudinal cross-section;

FIG. 2 is a fragmentary longitudinally cross-sectional view on an enlarged scale of the multi-layered bellows type exhaust tube as shown in FIG. 1;

FIG. 3 is a fragmentary longitudinally cross-sectional view of one layer of said multi-layered bellows type exhaust tube as shown in FIG. 2; and FIG. 4 is a schematic view of an exhaust system in which said multi-layered bellows type exhaust tube of the invention is disposed.

PREFERRED EMBODIMENT OF THE INVENTION

The present invention will be now described referring to the accompanying drawings in which one preferred embodiment of the multi-layered bellows type exhaust tube of the present invention is shown for illustration purpose.

First referring to FIG. 4 of the accompanying drawings shows the exhaust system in which the multi-layered bellows type exhaust tube of the invention is disposed as one component of the system. In FIG. 4, reference numeral 1 denotes an engine from which an exhaust manifold 2 extends. A communication pipe 3 is connected at one end to the other end of the exhaust manifold 2. The multi-layered bellows type exhaust tube 10 of the invention is connected at one end to the other end of the communication pipe 3 and at the other end to one end of a second communication pipe 3'. The other end of the second communication pipe 3' is connected to one end of a muffler 4 the other end of which is connected to a tail pipe 5. The engine 1, second pipe 3' and muffler 4 are resiliently supported on the body 6 of a vehicle through coiled springs 7.

The multi-layered bellows type exhaust tube 10 which constitutes the subject of the present invention comprises a multi-layered stainless steel web bellows 11 (three-layered in the illustrated embodiment), a cylindrical wire mesh shield 12 surrounding the bellows 11 in outwardly radial spaced relationship to the bellows and having the reduced diameter opposite ends and retaining rings 13, 13 which secure the reduced diameter opposite ends of the wire shield 12 to the communication pipes 3, 3', respectively. The multi-layered bellows 11 is formed by laying three thin stainless steel webs one upon another and then rolling the assembly into a spiral configuration having a corrugated cross-section.

With the above-mentioned construction and arrangement of the components of the exhaust system with the bellows type exhaust tube 10 of the invention disposed between the communication pipes 3, 3', when the engine 1 is operated, the vibration of the engine 1 is first transmitted to the communication pipes 3, 3', but since the multi-layered bellows type exhaust tube 10 is interposed between the communication pipes, the vibration transmitted to the communication pipes is absorbed by the exhaust tube 10 and not transmitted to the components of the exhaust system which are located downstream of the communication pipe 3' in the flow direction of the exhaust gas from the engine. And the acoustic energy of exhaust gas flowing through the bellows at high pressure and temperature produced in the engine 1 is attenuated by the interference action provided by an alternate increase and reduction in diameter or the alternate arrangement of the crests and valleys of the bellows and the resonance action provided by the spaces defined by the crests. Furthermore, since the bellows 11 comprising thin stainless steel webs are of the multi-layered construction, the vibration absorption effect and acoustic energy buffering action of the bellows are conspicuous. In addition, since the bellows are rolled into a spiral form, the gas flow swirls as the gas passes through the bellows to smooth variations in the pressure of the exhaust gas to thereby attenuate the acoustic energy of the gas.

Although it may be surmised that the greater the flexibility of the spiral multi-layered bellows 10 is, the greater the vibration absorption and acoustic attenuation effects of the bellows would be. However, if the bellows have an excessively great flexibility, an excessively great amplitude of vibration may be induced in the bellows to the extent that the bellows will be damaged. Thus, in order to prevent the induction of such excessively great amplitude of vibration in the bellows, according to the present invention, the cylindrical wire mesh shield 12 surrounds the bellows 11 in a peripherally spaced relationship to the bellows. The wire mesh shield 12 not only serves as means for suppressing such excessively great amplitude of vibration of the bellows, but also protects the bellows against potential damage which may be caused by deflected pebbles and/or contact between the bellows and road while the vehicle which employs the bellows of the present invention in its exhaust system is in motion.

In the bellows 11 of the present invention, since each of the three layers is formed of thin stainless steel web (having a thickness in the range from 0.15 mm to 0.3 mm) and rolled into a spiral configuration having a corrugated cross-section, the bellows exhibits great effects in absorbing the vibration of the engine and shielding the components of the exhaust system from such vibration. Thus, the bellows give a comfortable ride to the occupant or occupants in the vehicle and can effectively eliminate any noise from entering the vehicular compartment or compartments which is caused by the vibration of the vehicular body. Furthermore, the acoustic energy produced by the engine exhaust gas can also be attenuated by the interference and resonance actions and buffering effect offered by the bellows.

Furthermore, although the spiral, multi-layered bellows has a great flexibility, any excessive amplitude which the bellows may otherwise encounter can be prevented by the wire blade surrounding the bellows. And since the spiral, multi-layered bellows can be produced by merely rolling a continuous length of thin stainless steel web into a spiral configuration having a predetermined or desired corrugated cross-section, the bellows is suitable for mass production.

While only one embodiment of the invention has been shown and described in detail, it will be understood that this is for the purpose of illustration only and not to be taken as a restriction or limitation of the invention.

What is claimed is:

1. A bellows type acoustic energy attenuating exhaust tube for use in the exhaust system of a vehicular internal combustion engine comprising a spiral, multi-layered flexible bellows including a plurality of partially overlapping coaxial thin stainless steel web layers and connected at the opposite ends to communication pipes which connect said exhaust tube to the remainder of said exhaust system; means to prevent excessive expansion of said bellows surrounding said spiral, multi-layered bellows in outwardly radial spaced relationship to the bellows; and retainer rings for securing the opposed ends of said preventive means to said communication pipes.

2. The bellows type exhaust tube for use in the exhaust system of a vehicular internal combustion engine as set forth in claim 1, in which each of said coaxial stainless steel web layers has a thickness in the range of from 0.15 mm to 0.3 mm.

3. In an acoustic energy attenuating vehicular engine exhaust system which comprises a manifold having two ends, one end of which is connected to an engine; a first communication pipe having two ends, one end of which is connected to the second end of said manifold; an exhaust tube having two ends, one end of which is connected to the second end of said first communication pipe; a second communication pipe having two ends one end of which is connected to the second end of said exhaust tube; a muffler having two ends one end of which is connected to the second end of said second communication pipe; and a tail pipe connected at one end to the second end of said muffler, wherein said exhaust tube comprises a spiral, multi-layered, flexible bellows including a plurality of partially overlapping coaxial thin stainless steel webs; means to prevent excessive expansion of said bellows surrounding said multi-layered bellows in outwardly radial spaced relationship to the bellows; and retainer rings for securing the opposed ends of said preventive means to said communication pipes.

4. The bellows type exhaust tube for use in the exhaust system of a vehicular internal combustion engine as set forth in claim 3, in which each of said partially overlapping coaxial layers comprises a stainless steel web having a thickness in the range from 0.15 mm to 0.3 mm.

5. The bellows type exhaust tube as claimed in claim 1, wherein said preventive means is a cylindrical shield.

6. The vehicular engine exhaust system as claimed in claim 3, wherein said preventive means is a cylindrical shield.

7. The bellows type exhaust tube as claimed in claim 5, wherein said cylindrical shield is formed from wire mesh.

8. The vehicular engine exhaust system as claimed in claim 6, wherein said cylindrical shield is formed from wire mesh.

* * * * *

UNITED STATES PATENT AND TRADEMARK OFFICE
CERTIFICATE OF CORRECTION

PATENT NO. : 4,315,558
DATED : February 16, 1982
INVENTOR(S) : KAKUJI KATAYAMA

It is certified that error appears in the above-identified patent and that said Letters Patent are hereby corrected as shown below:

On the title page

In the foreign application priority date, cancel "54-131749" and insert therefor --54-151749--.

Signed and Sealed this

Twenty-ninth Day of March 1983

[SEAL]

*Attest:*

GERALD J. MOSSINGHOFF

*Attesting Officer*     *Commissioner of Patents and Trademarks*